United States Patent
Qi et al.

(10) Patent No.: US 9,128,837 B2
(45) Date of Patent: Sep. 8, 2015

(54) PROVIDING CUSTOMIZABLE, PROCESS-SPECIFIC JUST-IN-TIME DEBUGGING IN AN OPERATING SYSTEM

(75) Inventors: Yao Qi, Beijing (CN); Yan B J Li, Beijing (CN); Wei Ying Yu, Beijing (CN); Yong Z Y Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1575 days.

(21) Appl. No.: 12/210,484

(22) Filed: Sep. 15, 2008

(65) Prior Publication Data

US 2009/0089622 A1  Apr. 2, 2009

(30) Foreign Application Priority Data

Sep. 27, 2007  (CN) .......................... 2007 1 0169803

(51) Int. Cl.
 *G06F 11/36* (2006.01)
 *G06F 11/07* (2006.01)
(52) U.S. Cl.
 CPC ........ *G06F 11/0766* (2013.01); *G06F 11/0715* (2013.01); *G06F 11/3664* (2013.01)

(58) Field of Classification Search
 CPC .. G06F 11/3664; G06F 11/36; G06F 11/0766
 USPC .......................................................... 717/124
 See application file for complete search history.

(56) References Cited

U.S. PATENT DOCUMENTS

| | | | |
|---|---|---|---|
| 5,526,485 A * | 6/1996 | Brodsky ...................... 714/38.13 |
| 7,047,520 B2 * | 5/2006 | Moore et al. ................... 717/129 |
| 7,203,926 B2 * | 4/2007 | Bogle et al. .................... 717/124 |
| 7,721,265 B1 * | 5/2010 | Xu et al. ........................ 717/127 |
| 2003/0101322 A1 * | 5/2003 | Gardner ........................ 711/163 |
| 2006/0230390 A1 * | 10/2006 | Alexander et al. ............ 717/130 |

* cited by examiner

Primary Examiner — Wei Zhen
Assistant Examiner — Mohammed Huda
(74) Attorney, Agent, or Firm — Fleit Gibbons Gutman Bongini Bianco PL; Thomas Grzesik

(57) ABSTRACT

A method and a system for providing customizable, process-specific Just-In-Time debugging in operating system is provide in this invention. The method comprises the following steps: obtaining process-specific JIT debugging information, in response to the occurrence of an trap event in operating system; invoking the debugger corresponding to the process according to the obtained process-specific JIT debugging information. This method and system supports per-process JIT debugging configuration.

20 Claims, 8 Drawing Sheets

PROVIDING CUSTOMIZABLE, PROCESS-SPECIFIC JUST-IN-TIME DEBUGGING IN AN OPERATING SYSTEM

FIELD OF THE INVENTION

The present invention relates generally to the software debugging technology, particularly to a method and system for providing customizable, process-specific Just-In-Time debugging in an operating system.

BACKGROUND OF THE INVENTION

In the life cycle of software development, a "bug" means a program malfunction caused by programming or logic errors. One small bug might bring unacceptable loss in many special industries such as military, medical and financial industry. It's because of the potential risk of great lost that all commercial application programs are tested and debugged as completely as possible before release.

However, the rising complexity of software system brings more and more bugs that can not be re-produced or just occur occasionally. For these bugs, developers can not know when they will occur. They may occur on some special systems or they may occur after a long time, such as one hour or even several days, since the program is started. Even more, some of them might disappear if the target program is being controlled by one debugger. In this invention, the item Runtime Bugs will be used to represent the above program deficiencies.

Traditional debuggers could do little on Runtime Bugs. When one Runtime Bug occurs, if one debugger is started now to debug that program, it may be too late in that the context of bugged program is unavailable. JIT (Just-In-Time) debugging is proposed to address the above problem. JIT debugging is a technique by which the debugger could be invoked automatically when Runtime bugs occur. It has become an integral part of modern debugging. So far, some methods or systems have been designed to provide the JIT debugging. Among them, JIT debugging through exception hook and JIT debugging through OS-specific exception are two widely adopted methods.

The method JIT debugging through exception hook is put forwarded by the U.S. Pat. No. 5,526,485 incorporated herein by reference. It was to address the problem that the Windows 3.1 operating system is not able to load and run a debugging program in response to a program error. FIG. 1 shows a whole process of the method of JIT debugging through exception hook. In this method, with the help from an API library named TOOLHELP, one monitor program, which resides in memory, registers exception hooks with operating system. In response to an exception, the operating system will call the callback function, e.g. exception processing function formerly registered by monitor program. Then, the just-in-time monitor program will ask users whether they want to debug the target program or not. If the user indicates that debugging is desired, the callback function of the monitor will start a debugger configured in advance for the user to do interactive debugging. There are some problems in this method:

(1) This method introduces an additional JIT debugging monitor, which must be started before the target program is launched and it will always reside in system memory. Although the system resources consumed by the monitor might not be too many, it is undesirable in many cases because the presence of the JIT debugging monitor in system memory and the related consumption of resources might have an effect on the target program, precluding effective debugging;

(2) The method is not process-specific. It's oriented to all processes, which makes users bored by many notifications from other processes not cared by users at all;

(3) The method is of little flexible customizability. After the monitor is loaded into the memory, the registered exception hook functions have to keep unchanged. If they want to do some changes according to different requirements at different stages of one JIT debugging session, users have to modify the monitor program and restart it again. However, such actions will break up the entirety of one JIT debugging session.

(4) The method is based on an API library, named TOOLHELP, of the Windows. Therefore, it's possible for a number of different application programs to register the same type of exception hook functions. When one exception occurs, the operating system calls the registered exception hook functions in sequence until one hook function returns one special value to indicate the exception resolved. Thus, one exception interrupt, which should be originally captured by the JIT debugging monitor, might be handled by registered hook functions of other programs, which means users will lose chance of JIT debugging.

(5) This method is unable to provide JIT debugging for Runtime Bugs brought by incorrectly handled software interrupts Another method, JIT debugging through OS-specific built-in mechanism, is being widely taken by Microsoft Windows® operating system, such as Windows® 2000/XP/NT. The method is based on the built-in mechanism of Microsoft Windows®. Refer to http://msdn2.microsoft.com/en-us/library/5h4b7a6.aspx. The Microsoft Windows® operating system provides a mechanism referred to as "Exception handling", in which when one exception occurs, such as segment fault, the running program generating the exception will be notified by the kernel and given the opportunity of self-correcting, e.g. "First Chance Exception handling". If the application program is unable to handle or correct the exception, the operating system will attempt to handle it in a procedure called "Last Chance exception handling" or "Second Chance Exception handling". If it fails too, the operating system has a built-in mechanism for starting a utility program which can "connect" to the target program and extract information about the program in its faulty state before it is terminated.

The method of JIT debugging through OS-specific built-in mechanism utilizes above mechanism. Microsoft Windows uses one key in Windows registry to store the path of a debug loader program, such as the vsjit.exe provided by Microsoft Visual Studio. When one exception fails to be handled during the Last Chance exception handling, the kernel will extract the value of the registry key and launches the program. Then the program will notify users and check whether one debugger should be launched.

Although the method of JIT debugging through OS-specific built-in mechanism is better than the method of JIT debugging through exception hook in some ways, for example, no exception hook functions need to be registered, no monitor program resides in memory and there is no need to start additional program before launching target programs, the method of JIT debugging through exception hook can just only capture fatal exceptions. However, during debugging process, users care not only these fatal exceptions but also some common exceptions, which are handled in First and Last Chance Exception handling. If object program gets one unexpected exception at some certain circumstances, the method will not help. Furthermore, the method is also unable to provide debugging for Runtime Bugs brought by incorrectly handled software interrupts.

SUMMARY OF THE INVENTION

There are some disadvantages in the above prior arts. The weak support for a customizable process-specific JIT debugging from operating system contributes most to such kind of situation. If the operating system kernel could provide strong JIT debugging easily for applications running on it, the JIT debugging would be improved a lot.

This invention, from the operating system's perspective, improves the status of operating system's support for application's JIT debugging, and provides a customizable, process-specific JIT debugging ability.

The advantages of this invention over the prior arts are:

(1). There is no any intrusion enforced on debuggee (i.e. target program), because no additional application program will be launched or reside in memory before target programs are started. Only when the events cared by users happen and before the event is processed, the debugger will be loaded.

(2) Process-specific. This feature will make it very flexible to support different JIT debugging for different processes.

(3) Provides a new customizable event handler mechanism for operating system, for example, changing the event handler whenever needed.

According to one aspect of the invention, there is provided a method for providing customizable, process-specific Just-In-Time debugging in operating system, comprising obtaining process-specific JIT debugging information, in response to the occurrence of an trap event in operating system; invoking the debugger corresponding to the process according to the obtained process-specific JIT debugging information.

According to another aspect of the invention, there is provided a system for providing customizable, process-specific Just-In-Time debugging in operating system, comprising obtaining means for obtaining process-specific JIT debugging information, in response to the occurrence of a trap event of in operating system; invoking means for invoking the debugger corresponding to the process according to the obtained process-specific JIT debugging information.

According to a further aspect of the invention, there is provided a program product comprising program code for implementing the method described in the specification and medium for storing the program code.

BRIEF DESCRIPTION OF THE DRAWINGS

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DESCRIPTION OF THE PREFERRED EMBODIMENTS

Figure 1:
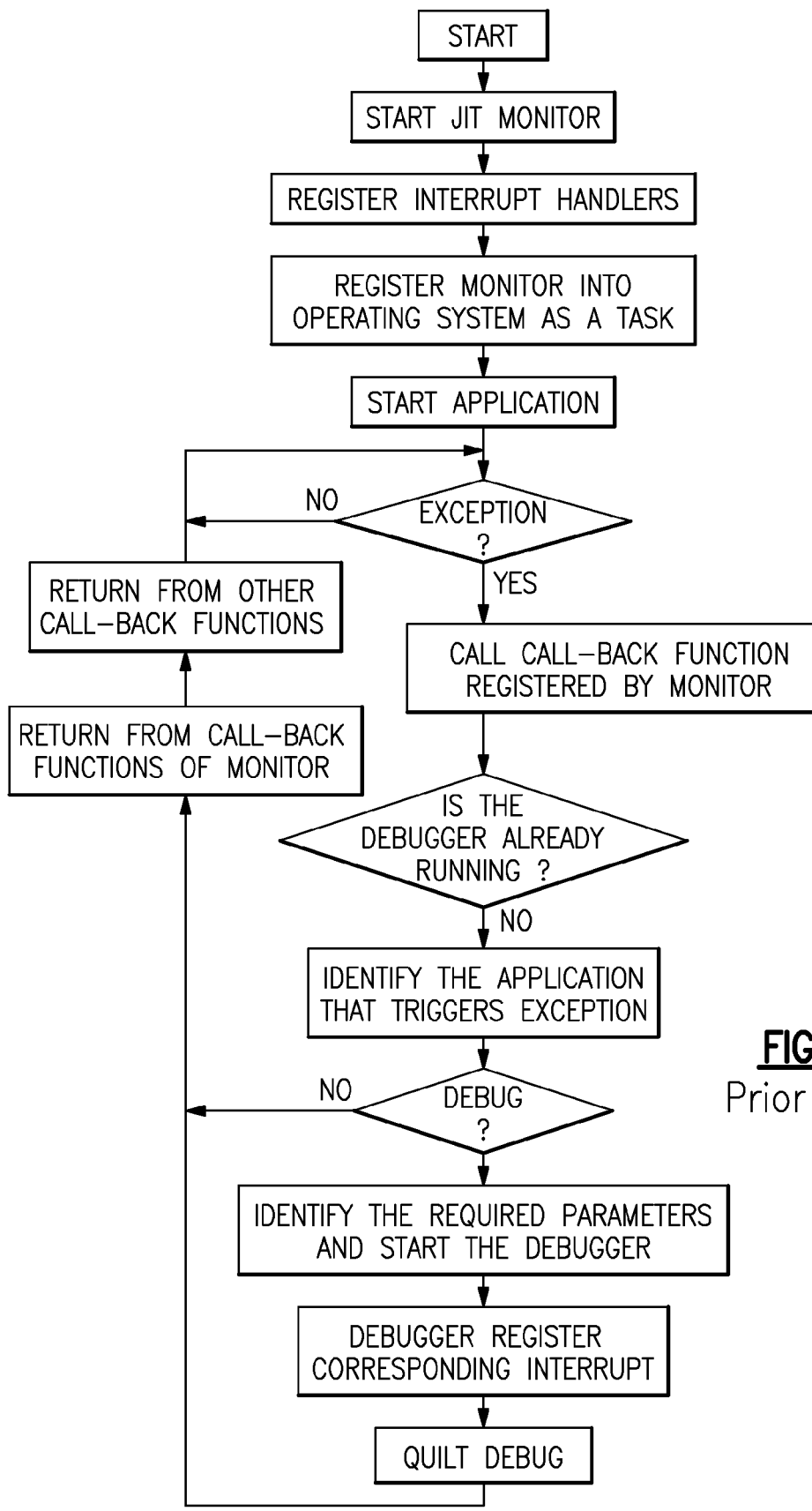
FIG. 1 illustrates a prior art whole process of the method of JIT debugging through exception hook.

Preferred embodiments of the present invention will now be described more fully hereinafter below in more detail with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

In prior arts, Interrupt and exceptions, provided by operating system, are key factors leading to Runtime Bugs when applications run. So, when it comes to Runtime Bugs, it's necessary to distinguish the interrupts and exceptions in computer system. An interrupt is an asynchronous event, which can occur at any time and is unrelated to what program the processor is executing. Interrupts are generated primarily by I/O devices, processor clocks, or timers, and they can be enabled (turned on) or disabled (turned off). An exception, in contrast, is a synchronous event that results from the execution of a particular instruction. Running a program a second time with the same data under the same conditions can reproduce exceptions.

Either hardware or software can generate interrupts and exceptions. For example, a bus error exception is caused by a hardware problem, whereas a divide-by-zero exception is the result of a software bug. Likewise, an I/O device can generate an interrupt, or the kernel itself can issue a software interrupt (such as a timer or signals in Linux).

Among all interrupts and exceptions, software interrupts and software or hardware exception are the main factors which result in Runtime bugs.

Software interrupts are the simulation of hardware interrupts. Different operating systems provide different software interrupt mechanism, such as ADC (Asynchronous Procedure Call Interrupts) or DPC (Deferred Procedure Call Interrupts or Dispatched Procedure Call Interrupts) in Microsoft Windows, and signal handling mechanism in Unix-like operating system. For application program developers, they can not know exactly when such asynchronous events will occur, which brings more Runtime Bugs. For example in Unix-like system, if one program writes one file, whose size exceeds the maximum allowed size of system, into disk, then the program will get one software interrupt(signal SIGXFSZ). If program does not handle the interrupt, the program will be terminated, which is one simple Runtime Bug.

Hardware or software exceptions are those that are unexpected by developer or are out of developer's consideration; they also bring Runtime Bugs. For example, if the program writes one file into a disk in which free space is not available any more, the system will throw out one DISK_NO_SPACE exception. If developers do not handle such kind of exception and continue other operations related to the file, Runtime Bugs will come.

In this invention, the item Trap Event is used to mean software interrupts, hardware and software exceptions mentioned in the above section.

According to this invention, operating system's provision of JIT debugging support for the application is implemented by modifying the trap event dispatching process in operating system; and it is also provided a customizable, process-specific JIT debugging ability in operating system. To facilitate understanding, the kernel event dispatching process and trap event dispatching process will be introduced in detail first.

Kernel event is processed by the event dispatching process in the operating system; the kernel event includes trap event and non-trap event. Trap event dispatching process, which is a sub-process of the kernel event dispatching process in operating system, is used to process the trap event.

Figure 2:
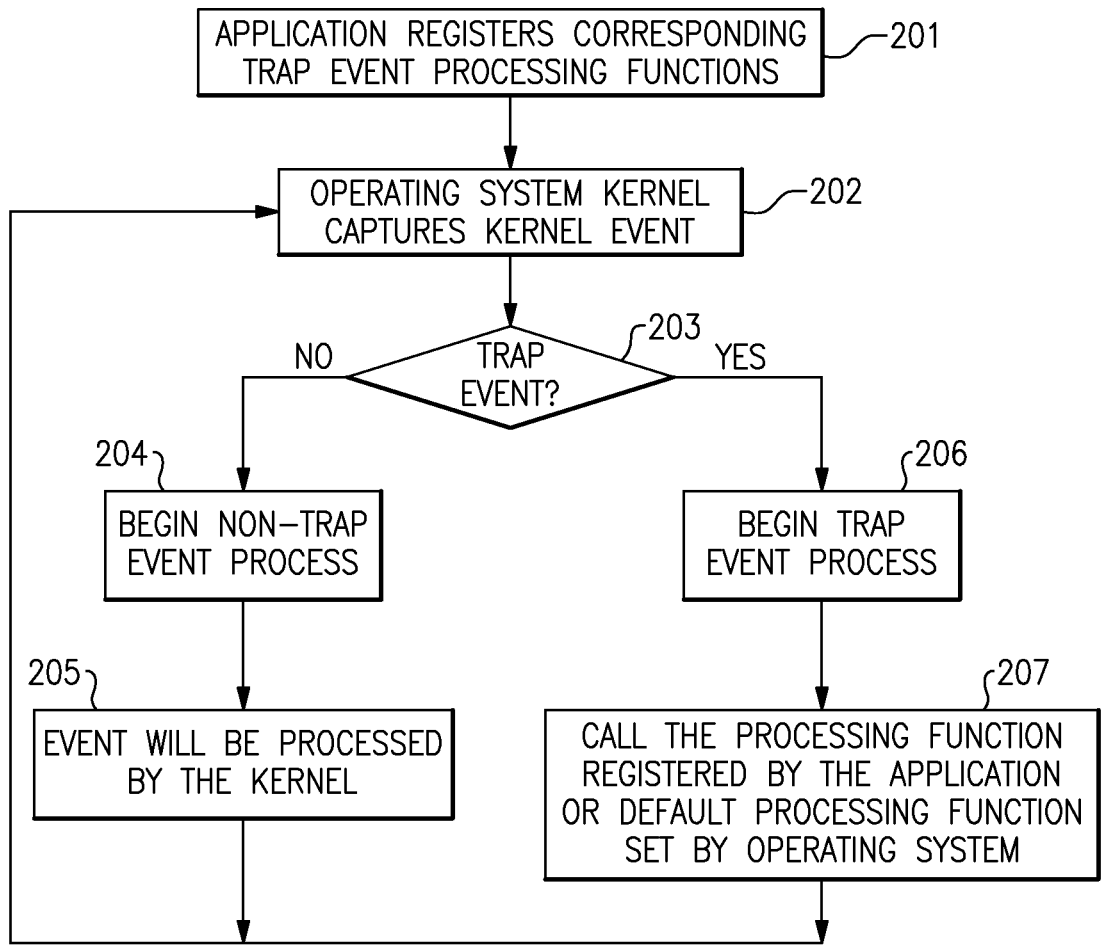
FIG. 2 illustrates the kernel event dispatching process and the trap event dispatching process in operating system.

FIG. 2 illustrates the kernel event dispatching process and the trap event dispatching process in operating system. Referring to FIG. 2, an application program uses the specific mechanism provided by operating system to register its own preferred Trap Event handler in step 201. This step is optional. If the application program has not registered any handler for Trap Event, the interface between application and operating system will keep the default handler, for example, to display in the screen that "fatal error happens", etc. When one kernel event occurs and is captured by operating system kernel in step 202, the kernel event will be recorded into one list or queue and then be transferred to the kernel. In step 203, it is determined if the kernel event is trap event or non-trap event; If it is a non-trap event, enter step 204, e.g. non-trap event process, then enter step 205, where the non-trap event will be processed by kernel itself. If it is a trap event, enter step 206, e.g. trap event process, and then the handler previously registered by the application is called in step 207. If the application has not registered handler previously, the default handler in operating system will be called.

In this invention, for JIT debugging, the purpose of providing different JIT debugger for different process is achieved by modifying the original trap event handling process in operating system by adding process-specific JIT debugging information to identify process-specific debugger, as well as calling the process-specific debugger when process related trap event occurred.

Figure 3:
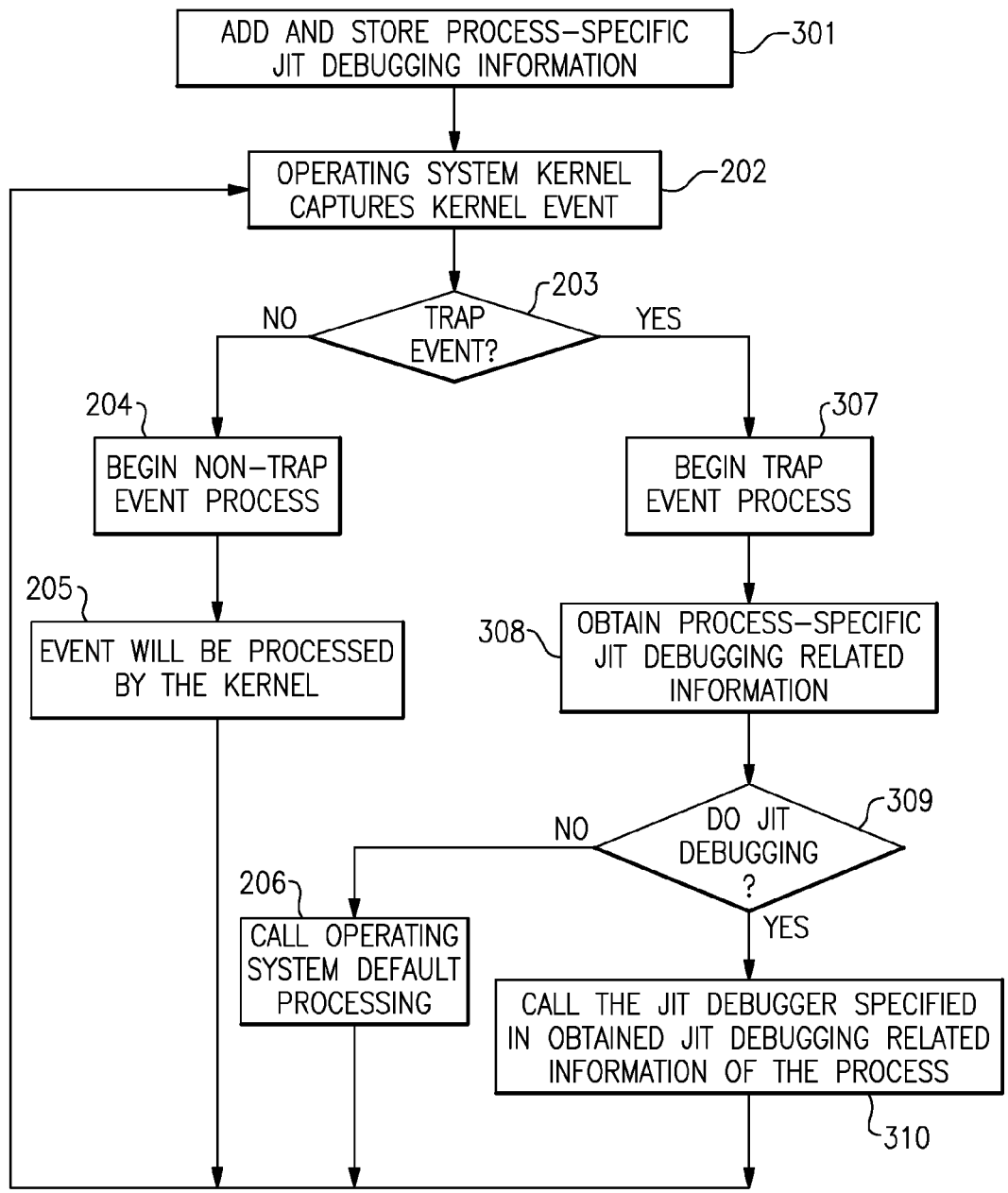
FIG. 3 illustrates the process for Just-In-Time debugging with customizable, process-specific JIT debugger in operating system.

FIG. 3 illustrates the process for JIT debugging with customizable, process-specific JIT debugger in operating system, in which kernel event dispatching process and non-trap event dispatching process of prior arts shown in FIG. 2 are included, and the modified trap event dispatching process is also included. In the modified trap event dispatching process, special trap event handler is registered, as shown in FIG. 3. In step 301, process-specific JIT debugging information is added. This step is optional, because the process-specific JIT debugging information can be obtained in other ways. For example, the information may be transferred from other computer systems by network. How to add the process-specific JIT debugging information will be introduced in detail later.

In step 308, the trap event occurs, and in response to the occurrence of the trap event in operating system, the process-specific JIT debugging information is obtained, and then the process enters step 309, where it is determined whether the user care about the trap event and whether the user wants JIT debugging. This step is just to facilitate users and it is optional for the method of Just-In-Time debugging with customizable, process-specific JIT debugger in operating system. If the user cares about the trap event and wants to do JIT debugging, then the process enters step 310, where the JIT debugger corresponding to the process according to the obtained process-specific JIT debugging information is called. By this, process-specific JIT debugging is achieved. If the users do not care about the trap event and JIT debugging, the default system handler of the prior art can be utilized.

In the step of adding process-specific JIT debugging information, the content of process-specific JIT debugging information has to be generated first. The process-specific JIT debugging information include debugger path, which records the debugger path for different process in the current file system. Once a trap event that the user cares about occurs and it is needed to load debugger, the operating system can know which debugger should be loaded according to the debugger path.

Alternatively, the process-specific JIT debugging information also includes JIT debugging flag, which can be used to enable or disable JIT debugging.

Alternatively, the process-specific JIT debugging information also includes JIT debugging event filter to provide more flexible customization. User can adjust the filter according to JIT debugging requirements.

For applications that comprise multiple processes, different JIT debuggers can be specified for each process. Moreover, different JIT debuggers can be specified for a specific process in different time, but different JIT debugger can not be specified for a specific process in same time, because the system will not know which debugger will be utilized then.

There are a lot of methods to add process-specific JIT debugging information; following will introduce how to add process-specific JIT debugging information in detail.

There are two steps to add process-specific JIT debugging information. First, configure the process-specific JIT debugging information; and then notify such information to the operating system. Besides, user can update JIT debugging flag and JIT debugging event filter on demand, so as to provide different JIT debugging support for different executable stages of the object code.

Figure 4:
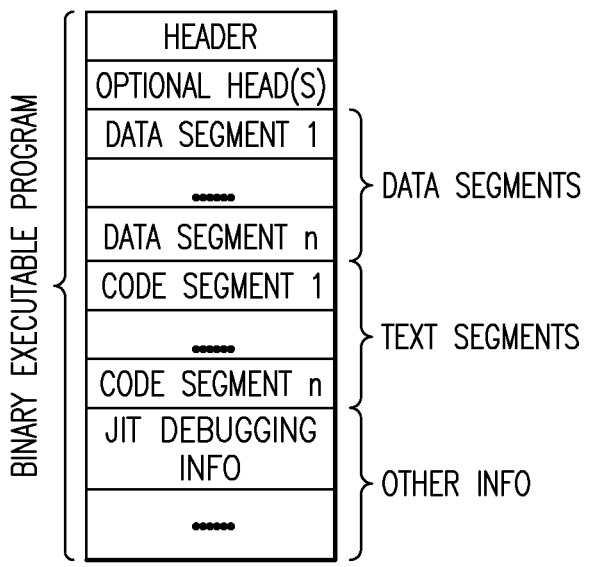
FIG. 4 illustrates an executable file format configured with JIT debugging information.

There are a lot of methods to configure process-specific JIT debugging information, for example:

Method 1: A compiler can provide such kind of option to support the generation of process-specific JIT debugging information and, optionally, to record it into executable file of program. Then the operating system loads this program and creates process for it, the process-specific JIT debugging information can be recognized and loaded. Most popular executable file formats, such as ELF, PE and COFF, support splitting files into sections or segments by function. Thus it is easy to attach a new section or segment to store the process-specific JIT debugging information. FIG. 4 illustrates an executable file combined with JIT debugging information, which can be generated by the complier according to compiling options set by user.

Method 2: operating system can provide additional configure tool (such as SMIT on AIX operating system) for user to modify the JIT debugging information.

Method 3: Interface for accessing process-specific JIT debugging information can be provided in proc file system for Unix/Linux-like systems, so that users could modify it according to their requirements at run-time.

Method 4: system calls can be provided by operating system for accessing the JIT debugging information.

Method 5: the process-specific JIT debugging information can be stored outside of the executable file, into a standalone configuration file. For example, the information can be saved into a file using a file name that is same with the executable file, but with different filename extension such as ".INI". If the executable file name is NOTEPAD.EXE, then file NOTEPAD.INI can be created in the same folder to setup the process-specific JIT debugging information, the content of the file is illustrated as below:

[JIT DEBUG]
DEBUGGER_PATH=C:\DEV\WINDBG.EXE
DEBUG_FLAG=1
DEBUG_MASK=0xFF

Above methods implement the generation and storage of the process-specific JIT debugging information. Then this information, which is able to notify the operating system when and how to process events occurred in a process from the JIT debugging point of view, has to be loaded and managed by the operating system at run-time. There are a lot of notifying methods, which will be illustrated in detail below.

Method 1: Extend Process Control Block (PCB) of Operating System

Figure 5:
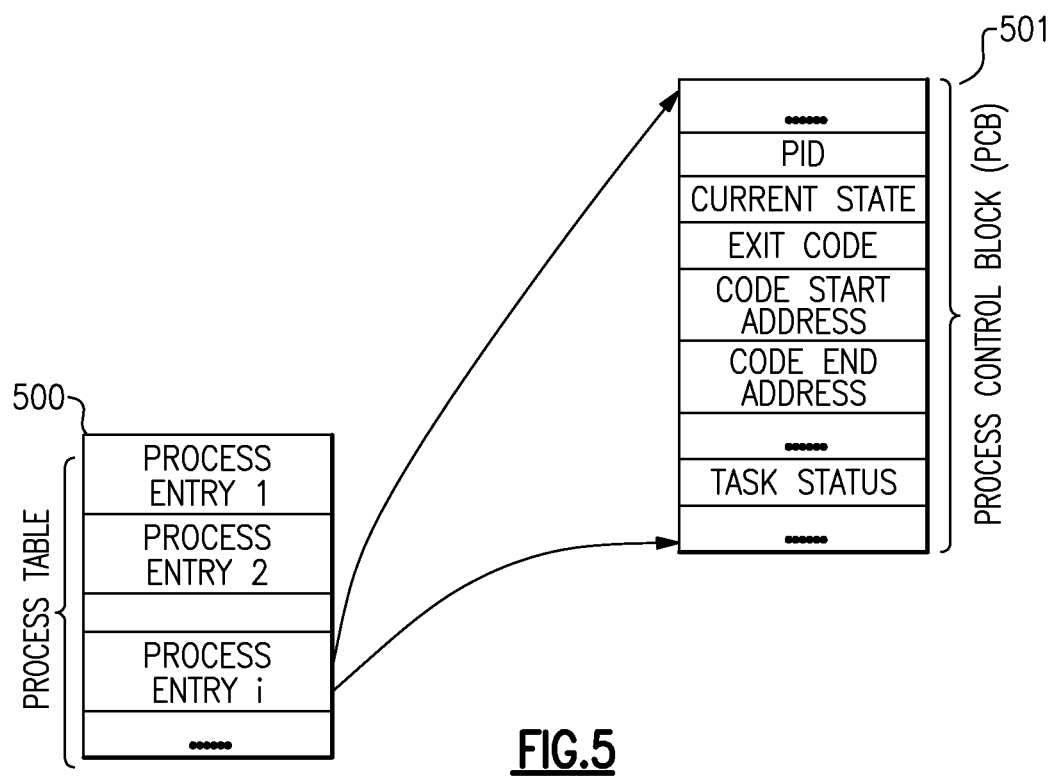
FIG. 5 illustrates the mutual relationship between process table and process control block.

Process Control Block should be introduced first in order to introduce this method. In order to keep track of all processes in the operating system, the operating system maintains one or more process tables, in which each entry corresponds to a process. Each process table entry points to a piece of data called Process Control Block (PCB). The relationship of process table and PCB is illustrated by FIG. 5. Operating system controls processes by the process information recorded in PCBs. Such information includes PID (process identity), process status information, etc.

Figure 6:
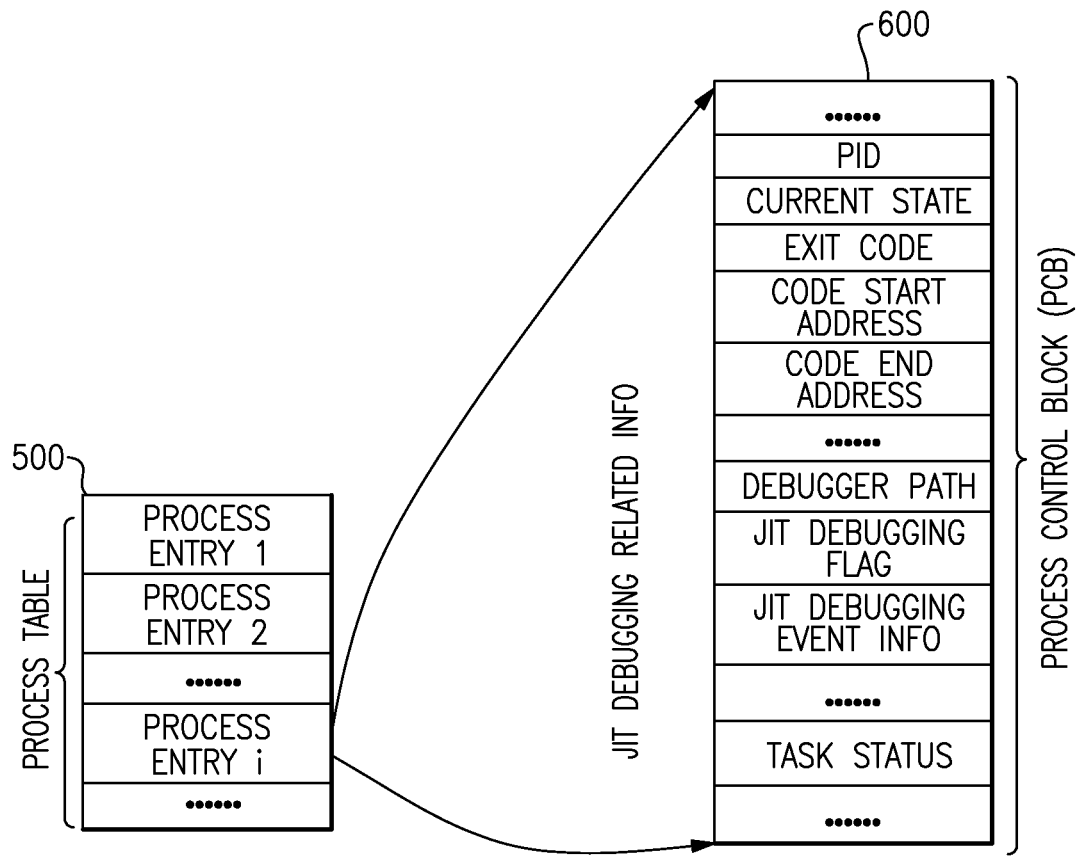
FIG. 6 illustrates the extended process control block added with JIT debugging information.

During the lifetime of a process, the information in PCB is not invariable; some information is adjustable by privileged users. Users can change them to meet their requirements. In this invention, the PCB is extended in order to save the JIT debugging information in the operating system, the extended PCB is shown in FIG. 6, which illustrates the PCB extended with JIT debugging information. When the operating system loads a program and creates a process for it, the stored JIT debugging information can be added into the PCB of the operating system as shown in FIG. 6.

In the method shown in FIG. 4, the kernel may determine whether the JIT debugging is enabled by checking the JIT debugging information stored in PCB. If the JIT debugging flag is set as disabled, the kernel just dispatch the trap event as in most cases without additional operation. If the JIT debugging flag is set as enabled, the kernel further checks whether the user cares about the trap event by checking the mask flags of the JIT debugging information. If the user cares about the trap event, the kernel will load the debugger specified by the debugger path, and then transfer the control of the object process to the debugger.

The above implementation is easy. For example, part of adjustable JIT debugging information can be loaded into /proc file system in Linux system, and can be modified by a user as needed.

Figure 7:
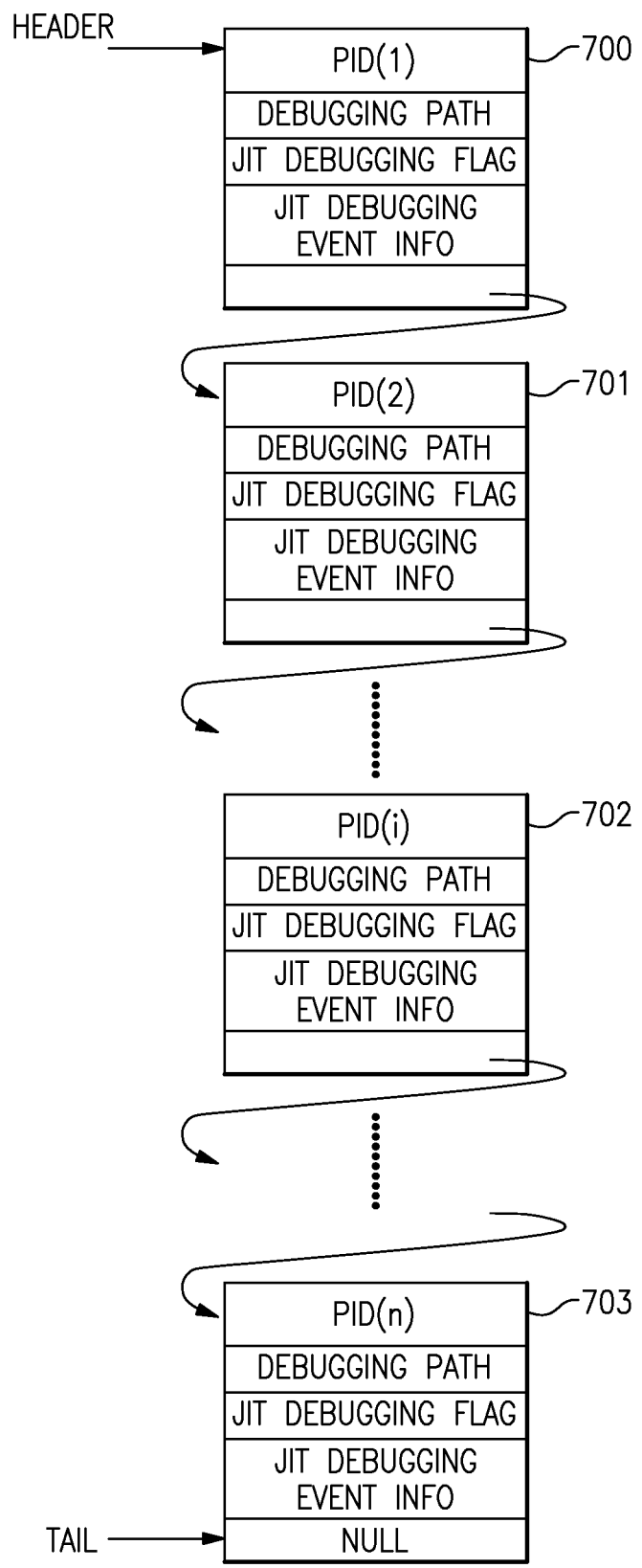
FIG. 7 illustrates the list of JIT debugging information.

Method 2: in this method, the PCB is not extended. Instead, the kernel maintains a list of JIT debugging information for all processes, as shown in FIG. 7. In this method, kernel manages the JIT debugging information of processes as nodes of a list which can be accessed by PID (process identifier). When the operating system loads a program and creates a process for it, the configured JIT debugging information can be added into the list of JIT debugging information. In this method, when a process needs JIT debugging support, the kernel searches the list of JIT debugging information by PID to obtain the process-specific JIT debugging information.

Figure 8:
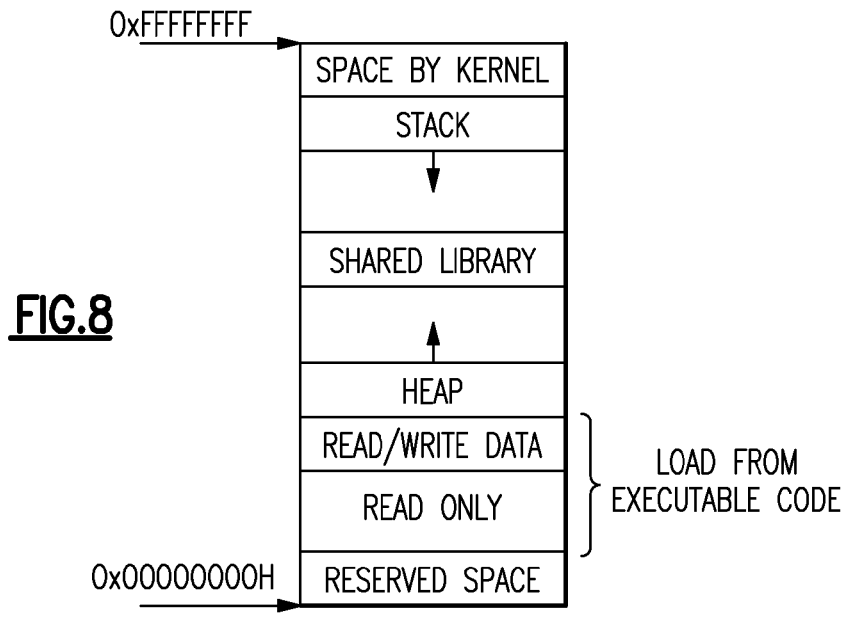
FIG. 8 illustrates the process space in memory.
Figure 9:
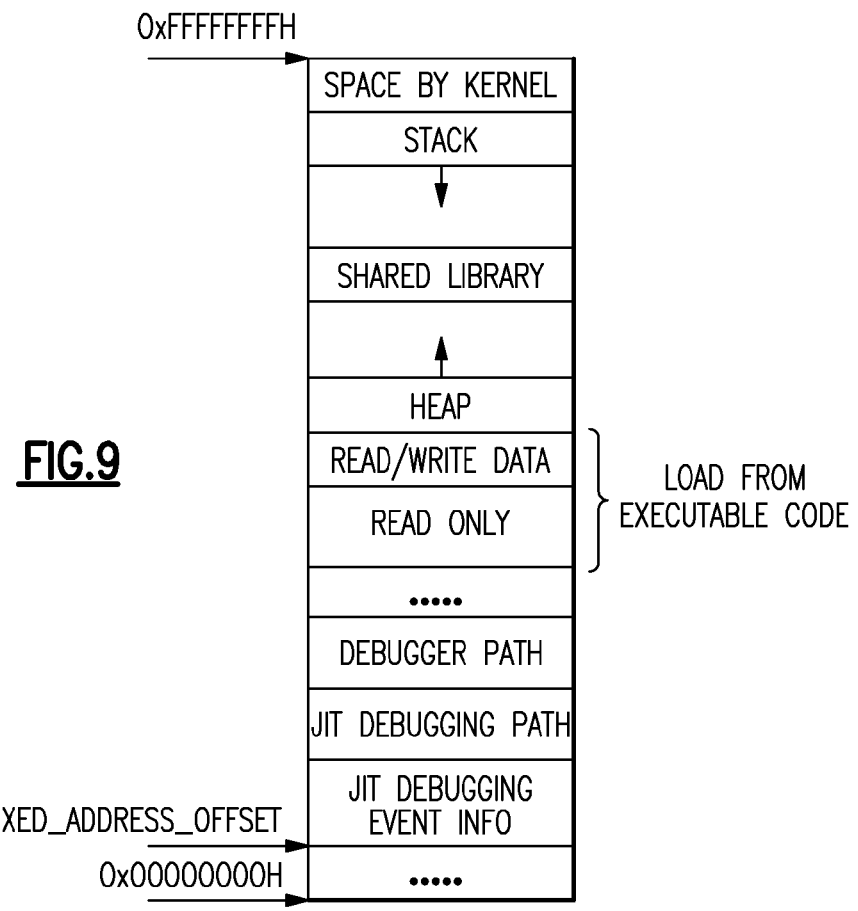
FIG. 9 illustrates a modified process space in memory.

Method 3: the JIT debugging information is recorded in a fixed location JIT_INFO_FIXED_ADDRESS_OFFSET within the process space, for example, at 0x01000000H. This address is fixed for all processes. When the operating system loads a program and creates a process for it, the configured JIT debugging information is loaded to this fix location. When the kernel needs to access the JIT debugging information of a process, it can directly read the information stored at the address of IT_INFO_FIXED_ADDRESS_OFFSET. FIG. 8 illustrates the process space in memory. And FIG. 9 illustrates a modified process space in memory.

With the methods described above, the operating system can obtain and manage the JIT debugging information, and support customizable, process-specific JIT debugging. In the following, the scenario in which a compiler provides options to support the generation of JIT debugging information, which is then recorded into the executable file of the program, with extended PCB in the operating system, is taken as an example to introduce the running process in the operating system.

1. Compiling the program with JIT debugging information options, for example cc-fjit=on-fjit_debugger=/usr/bin/dbx-fjit-mask=0x0h-o hello hello.c During the compilation, the compiler creates an additional JIT debugging segment in the final executable program according to the JIT debugging information option, ands stores the corresponding JIT debugging information in that segment.

2. The operating system loads the executable program, along with the JIT debugging information generated in step 1.

3. The JIT debugging information loaded in step 2 is used to set the entries of extended attribute in PCB.

Some attributes of PCB are adjustable at run-time, which provides more flexible customization.

4. When a trap event occurs, the operating system checks JIT debugging flag in extended information to decided whether it should support JIT debugging or not. If it JIT debugging is not enabled, the operating system dispatches the trap event as before; if JIT debugging is enabled and user cares about this trap event, then the operating system invokes the debugger as indicated in debugger path of the extended information and transfer the control of object process to the debugger.

5. The user does the debugging work.

Figure 10:
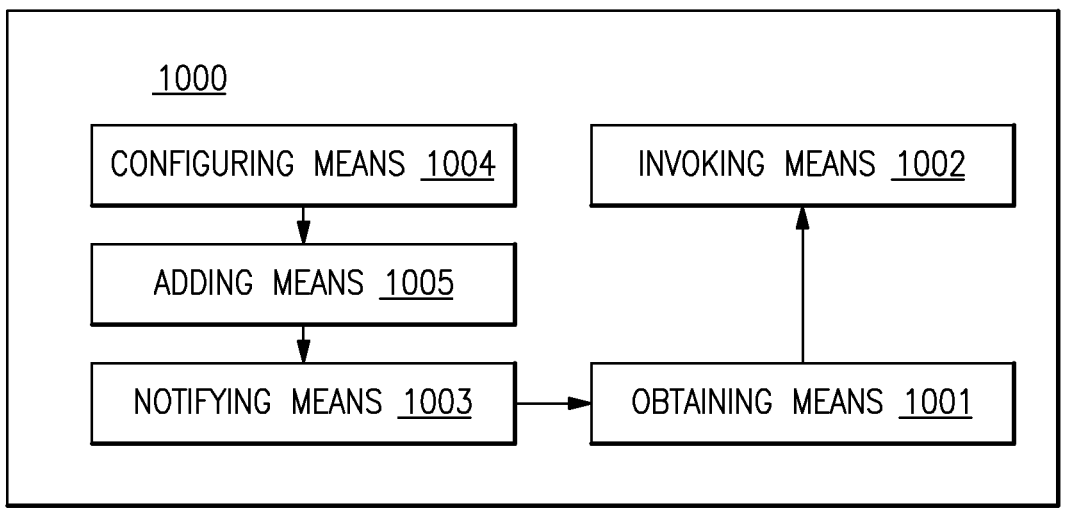
FIG. 10 illustrates a system for Just-In-Time debugging with customizable, process-specific JIT debugger in operating system.

Based on the same invention design, there is provided a system 1000 for providing customizable, process-specific Just-In-Time debugging in operating system, as shown in FIG. 10. The system comprise obtaining means 1001 for obtaining process-specific JIT debugging information, in response to the occurrence of a trap event in operating system; invoking means 1002 for invoking the debugger corresponding to the process according to the obtained process-specific JIT debugging information, notifying means 1003 for notifying the process-specific JIT debugging information into the operating system; configuring means 1004 for configuring JIT debugging information and adding means 1005.

Here, the system is corresponding to the method in this invention, wherein the JIT debugging information include debugger path. Alternatively, JIT debugging information also include JIT debugging flag, which can be used to enable or disable JIT debugging, so as to indicate whether JIT debugging support for processes is provided. Alternatively, JIT debugging information also includes JIT debugging event filter to provide more flexible customization. User can adjust the filter according to JIT debugging requirements.

In this system, the notifying means 1003 can be implemented with one of the following methods:

extending PCB in operating system and adding the JIT debugging information;

operating system kernel maintains a list of JIT debugging information for all processes;

storing the JIT debugging information at a fixed location in corresponding process space.

The above mentioned extension and implementation method of notifying means 1003 is consistent with the method description of this invention and omitted here.

In this system, the configuring means 1004 can be implemented with one of the following methods:

Compiler provides option to support the JIT debugging information generation and store the information into executable file of the program.

The operating system provides additional tools to support the modification for the JIT debugging information of the process.

Unix-like operating system provides an interface for setting up the JIT debugging information in proc file system.

The operating system provides system calls to implement the modification of JIT debugging information of a process;

Storing the JIT debugging information into configuration files outside the executable file.

The above mentioned extension and implementation method of configuring means 1004 is consistent with the method description of this invention and omitted here.

In this system, the adding means 1005 for loading the application and creating processes for it, adds the configured JIT debugging information into one of the following storage:
  a. Extended PCB in operating system;
  b. list of JIT debugging information maintained by the operating system for all processes;
  c. a fixed location of the corresponding process space.

For the system for Just-In-Time debugging with customizable, process-specific JIT debugger in operating system, the working process in the operating system are shown as the followings:

1. Configure the JIT debugging information with the configuring means 1004;
2. Transfer the recognized JIT debugging information by the adding means 1005 to the notifying means 1003, thus, the operating system can obtain the JIT debugging information.
3. When a trap event occurs and JIT debugging is desired, the operating system obtains the JIT debugging information by the obtaining means 1001, and then invokes the corresponding debugger by the invoking means 1002 according to the obtained JIT debugging information.
4. The user does the debugging work.

The present invention also provides a program product, which comprises the program code implementing the above methods and medium for storing the program code.

Although the illustrative embodiments have been described herein with reference to the accompanying drawings, it is to be understood that the present invention is not limited to those precise embodiments, and that various other changes and modifications may be affects therein by one of ordinary skill in the related are without departing from the scope or spirit of the invention. All such changes and modifications are intended to be included within the scope of the invention as described by the appended claims.

We claim:

1. A method for providing customizable, process-specific Just-In-Time (JIT) debugging in an operating system, the method comprising:

maintaining a first set of JIT debugging information and at least a second set of JIT debugging information defined by a user, wherein the first set of JIT debugging information is associated with at least a first process and wherein the second set of JIT debugging information is associated with a second process, wherein the first set of JIT debugging information at least identifies a first trap event and indicates whether the first trap event is to be debugged with a first JIT debugger that is specific to the first process, wherein the second set of JIT debugging information at least identifies a second trap event and indicates whether the second trap event is to be debugged with a second JIT debugger that is specific to the second process, and wherein the first JIT debugger and second JIT debugger are different process-specific JIT debuggers;

executing at least one of the first process and the second process with at least one processor absent the first JIT debugger and the second JIT debugger being resident in memory;

identifying, with the processor and based on the executing, that at least one of the first trap event and the second trap event has occurred within an operating system;

based on identifying the first trap event and the first set of JIT debugging information indicating that the first trap event is to be debugged, loading the first JIT debugger to perform JIT debugging on the first process, and based on identifying the second trap event and the second set of JIT debugging information indicating that the second trap event is to be debugged, loading the second JIT debugger to perform JIT debugging on the second process.

2. The method as recited in claim 1, wherein the trap event comprises any one of a software interrupt, a hardware interrupt, and a software exception event.

3. The method as recited in claim 1, wherein the set of JIT debugging information further comprises location information associated with the JIT debugger identified within the set of JIT debugging information.

4. The method as recited in claim 1, wherein maintaining a set of JIT debugging information comprises loading the set of JIT debugging information into the operating system.

5. The method as recited in claim 4, wherein loading the set of JIT debugging information into the operating system is implemented by any one of:

extending a Process Control block (PCB) in the operating system and adding the set of JIT debugging information to the PCB;

maintaining in an operating system kernel a list of JIT debugging information for all processes including the set of JIT debugging information; and storing the set of JIT debugging information at a fixed location in a corresponding process space.

6. The method as recited in claim 5, wherein loading the set of JIT debugger information further comprises configuring the set of JIT debugging information.

7. The method as recited in claim 6, wherein configuring the set of JIT debugging information is implemented by any one of:

a compiler provided option supporting an operation for generating the set of JIT debugging information and recording the set of JIT debugging information into an executable file of a program;

the operating system providing additional tools supporting modification for the set of JIT debugging information;

a Unix-like operating system providing an interface for setting up the set of JIT debugging information in a proc file system;

the operating system providing system calls implementing a modification of the set of JIT debugging information; and storing the set of JIT debugging information into configuration files outside the executable file.

8. The method as recited in claim 6, wherein loading the set of JIT debugging information further comprises:
responsive to the operating system commencing to load an application and create processes for the application, adding the configured set of JIT debugging information into any one of:
an extended Process Control Block (PCB) storage in the operating system;
a list of JIT debugging information maintained by the operating system for all processes; and
a fixed location within corresponding process space.

9. A system for providing customizable, process-specific Just-In-Time (JIT) debugging in an operating system, comprising:
a memory;
a processor communicatively coupled to the memory, wherein the processor is configured to perform a method comprising:
maintaining a first set of JIT debugging information and at least a second set of JIT debugging information defined by a user, wherein the first set of JIT debugging information is associated with at least a first process and wherein the second set of JIT debugging information is associated with a second process,
wherein the first set of JIT debugging information at least identifies a first trap event and indicates whether the first trap event is to be debugged with a first JIT debugger that is specific to the first process,
wherein the second set of JIT debugging information at least identifies a second trap event and indicates whether the second trap event is to be debugged with a second JIT debugger that is specific to the second process, and
wherein the first JIT debugger and second JIT debugger are different process-specific JIT debuggers;
executing at least one of the first process and the second process with at least one processor absent the first JIT debugger and the second JIT debugger being resident in memory;
identifying, with the processor and based on the executing, that at least one of the first trap event and the second trap event has occurred within an operating system;
based on identifying the first trap event and the first set of JIT debugging information indicating that the first trap event is to be debugged, loading the first JIT debugger to perform JIT debugging on the first process, and
based on identifying the second trap event and the second set of JIT debugging information indicating that the second trap event is to be debugged, loading the second JIT debugger to perform JIT debugging on the second process.

10. The system as recited in claim 9, wherein the trap event comprises any one of a software interrupt, a hardware interrupt, and a software exception event.

11. The system as recited in claim 9, wherein the set of JIT debugging information further comprises location information associated with the JIT debugger identified within the set of JIT debugging information.

12. The system as recited in claim 9, wherein maintaining a set of JIT debugging information comprises loading the set of JIT debugging information into the operating system.

13. The system as recited in claim 12, wherein loading the set of JIT debugging information into the operating system is implemented by any one of:

extending a Process Control block (PCB) in the operating system and adding the set of JIT debugging information to the PCB;
the operating system maintaining a list of JIT debugging information for all processes including the set of JIT debugging information; and
storing the set of JIT debugging information at a fixed location in a corresponding process space.

14. The system as recited in claim 13, wherein loading the set of JIT debugger information further comprises configuring the set of JIT debugging information.

15. The system as recited in claim 13, wherein configuring the set of JIT debugging information is implemented by any one of:
a compiler providing an option for supporting an operation for generating the set of JIT debugging information and recording the set of JIT debugging information into an executable file of a program;
the operating system providing additional tools supporting modification for the set of JIT debugging information;
a Unix-like operating system providing an interface for setting up the set of JIT debugging information in a proc file system;
the operating system providing system calls implementing a modification of the set of JIT debugging information; and
storing the set of JIT debugging information into configuration files outside the executable file.

16. The system as recited in claim 14, wherein loading the set of JIT debugging information further comprises:
responsive to the operating system commencing loading an application and creating processes for the application, adding the configured set of JIT debugging information into any one of:
extended Process Control Block (PCB) storage in operating system;
list of JIT debugging information maintained by the operating system for all processes; and
a fixed location within the corresponding process space.

17. A computer program product for providing customizable, process-specific Just-In-Time (JIT) debugging in an operating system, the computer program product comprising a non-transitory storage medium storing program code for performing a method comprising:
maintaining a first set of JIT debugging information and at least a second set of JIT debugging information defined by a user, wherein the first set of JIT debugging information is associated with at least a first process and wherein the second set of JIT debugging information is associated with a second process,
wherein the first set of JIT debugging information at least identifies a first trap event and indicates whether the first trap event is to be debugged with a first JIT debugger that is specific to the first process,
wherein the second set of JIT debugging information at least identifies a second trap event and indicates whether the second trap event is to be debugged with a second JIT debugger that is specific to the second process, and
wherein the first JIT debugger and second JIT debugger are different process-specific JIT debuggers;
executing at least one of the first process and the second process with at least one processor absent the first JIT debugger and the second JIT debugger being resident in memory;
identifying, with the processor and based on the executing, that at least one of the first trap event and the second trap event has occurred within an operating system;

based on identifying the first trap event and the first set of JIT debugging information indicating that the first trap event is to be debugged, loading the first JIT debugger to perform JIT debugging on the first process, and based on identifying the second trap event and the second set of JIT debugging information indicating that the second trap event is to be debugged, loading the second JIT debugger to perform JIT debugging on the second process.

18. The program product as recited in claim 17, wherein the trap event comprises any one of a software interrupt, a hardware interrupt, and a software exception event, and wherein the set of JIT debugging information further comprises location information associated with the JIT debugger identified within the set of JIT debugging information.

19. The program product as recited in claim 17, wherein maintaining a set of JIT debugging information comprises loading the set of JIT debugging information into the operating system, wherein loading the set of JIT debugging information into the operating system is implemented by any one of:

extending a Process Control block (PCB) in the operating system and adding the set of JIT debugging information to the PCB;

maintaining in an operating system kernel a list of JIT debugging information for all processes including the set of JIT debugging information; and storing the set of JIT debugging information at a fixed location in a corresponding process space.

20. The program product as recited in claim 19, wherein loading the set of JIT debugger information further comprises configuring the set of JIT debugging information, and wherein configuring the set of JIT debugging information is implemented by any one of:

a compiler provided option supporting an operation for generating the set of JIT debugging information and recording the set of JIT debugging information into an executable file of a program;

the operating system providing additional tools supporting modification for the set of JIT debugging information;

a Unix-like operating system providing an interface for setting up the set of JIT debugging information in a proc file system;

the operating system providing system calls implementing a modification of the set of JIT debugging information; and storing the set of JIT debugging information configuration files outside the executable file.

\* \* \* \* \*